United States Patent [19]
Iizuka

[11] Patent Number: 5,733,220
[45] Date of Patent: Mar. 31, 1998

[54] WORKING FLUID PRESSURE CONTROL SYSTEM FOR STARTUP FRICTION ELEMENTS OF R TO N TO D SHIFTS

[75] Inventor: Naonori Iizuka, Fuji, Japan

[73] Assignee: Jatco Corporation, Fuji, Japan

[21] Appl. No.: 696,694

[22] Filed: Aug. 14, 1996

[30] Foreign Application Priority Data

Aug. 31, 1995 [JP] Japan .................. 7-224037

[51] Int. Cl.$^6$ ................................. F16H 61/06
[52] U.S. Cl. ............... 477/116; 477/117; 477/156
[58] Field of Search ..................... 477/116, 117, 477/143, 156, 158, 174

[56] References Cited

U.S. PATENT DOCUMENTS

| 5,558,599 | 9/1996 | Tsukamoto et al. | 477/116 |
| 5,655,993 | 8/1997 | Fujimoto et al. | 477/116 |

FOREIGN PATENT DOCUMENTS

| 1-105050 | 10/1987 | Japan . | |
| 3-28571 | 6/1989 | Japan . | |
| 6-11026 | 1/1994 | Japan | 477/117 |
| 92021898 | 12/1992 | WIPO | 477/116 |

*Primary Examiner*—Khoi Q. Ta
*Attorney, Agent, or Firm*—Foley & Lardner

[57] ABSTRACT

A working fluid pressure control system for an automatic power transmission includes a pre-charge pressure regulating mechanism for temporarily elevating a working fluid pressure abruptly and subsequently drop the working fluid pressure for generating a pre-charging constant pressure for a start-up friction element, and a detecting portion for detecting an operational range before selection of neutral range. When selection is made from neutral range to a traveling range, and the traveling range is different from the operational range before selection of the neutral range, the pre-charge pressure regulating mechanism is actuated when judgement is made that the start-up friction element engaged in the operational range before selection of neutral range is released, thus selection being performed within a short period without accompanying with a shock.

9 Claims, 7 Drawing Sheets

WORKING FLUID PRESSURE CONTROL SYSTEM FOR STARTUP FRICTION ELEMENTS OF R TO N TO D SHIFTS

BACKGROUND OF THE INVENTION

1. Field of the Invention

The present invention relates generally to a working fluid pressure control system for an automatic power transmission. More specifically, the invention relates to a working fluid pressure control system for an automatic power transmission which can reduce a select shock upon selection of a driving range from a neutral range.

2. Description of the Related Art

Conventional working fluid pressure control system for an automatic power transmission of the type, to which the present invention is directed, has been disclosed in Japanese Patent Application Laid-open No. 28571/1991.

The disclosed system includes a pre-charge pressure regulating means for generating a constant pressure for pre-charging by once abruptly elevating a working fluid pressure temporarily and subsequently dropping the working fluid pressure abruptly upon switching of an operational range from a neutral range to a driving range by inputting a range signal and a capacity adjusting pressure regulating means for generating a capacity adjusting pressure for friction elements by gradually elevating the working fluid pressure from the dropped point of the pre-charge pressure. With such construction, it is intended to achieve both of shortening a period of time required for a range selecting operation and reducing of a select shock with the friction elements quickly placed in a stand-by condition for the engagement by once abruptly elevating the working fluid pressure temporarily and subsequently dropping the working fluid pressure abruptly upon switching of the operational range by the pre-charge pressure regulating means, and subsequently, gradually elevating the working fluid pressure by the capacity adjusting pressure regulating means for reducing a shock upon completion of engagement of the friction elements.

However, in such conventional working fluid pressure control system for the automatic power transmission, when a selector lever is operated quickly from a reverse range position via a neutral range to a drive range, it takes a long period for releasing since the working fluid pressure is once elevated by the above-mentioned pre-charge pressure during releasing. Moreover, friction elements for forward driving are engaged before completely releasing the working fluid of the friction elements for reverse driving. This may result in the state possibly causing interlocking in both friction elements.

SUMMARY OF THE INVENTION

In view of the problems encountered in the conventional system set forth above, and thus it is an object of the invention to provide a working fluid pressure control system for an automatic power transmission which can permit selection, in particular, from a neutral range to a driving range in a short period without causing a shock upon selection.

In a first aspect of the present invention, there is provided a working fluid pressure control system for an automatic power transmission, comprising:

pre-charge pressure regulating means for temporarily elevating a working fluid pressure abruptly and subsequently dropping abruptly and whereby generating a pre-charging constant pressure for a start-up friction element;

capacity adjustment pressure regulating means for gradually elevating the working fluid pressure from a dropped point of the pre-charge pressure for generating a capacity adjusting pressure for the start-up friction element, means for detecting an operational range before selection of neutral range, means, being active when the operational range before selection of the neutral range is different from a traveling range selected from the neutral range, for making judgement whether the start-up friction element which has been engaged in the operational range before selection of the neutral range, is released or not; and wherein the pre-charge pressure regulating means is operated in response to judgement that the start-up friction element which has been engaged in the operational range before selection of the neutral range, is released.

The making judgement means may make judgement that the start-up friction element which has been engaged in the operational range before selection of the neutral range, is released, after expiration of a predetermine period from selection from the operational range before selection of neutral range to the traveling range.

The predetermine period may be set depending upon a temperature of the working fluid.

The making judgement means may include means for detecting a turbine speed, and judges releasing of the start-up friction element which has been engaged in the operational range before selection of the neutral range when the turbine speed exceeds a predetermined rotation speed.

The operational range before selection of the neutral range may be reverse range and the traveling range is forward drive range.

In a second aspect of the present invention, there is provided a working fluid pressure control system for an automatic power transmission comprising:

pre-charge pressure regulating means, responsive to selection from neutral range to a traveling range, for temporarily elevating a working fluid pressure abruptly until detection of initiation of engagement of a start-up friction element corresponding to the selected traveling range and supplying a predetermined hydraulic pressure after initiation of engagement, means for detecting an operational range before selection of neutral range, means, being active when the operational range before selection of the neutral range is different from the traveling range selected from the neutral range, for making judgement whether the start-up friction element which has been engaged in the operational range before selection of the neutral range, is released or not; and wherein the pre-charge pressure regulating means is operated in response to judgement that the start-up friction element which has been engaged in the operational range before selection of the neutral range, is released.

The operational range before selection of the neutral range may be reverse range and the traveling range is forward drive range.

The making judgement means may include means for detecting a turbine speed, and judges releasing of the start-up friction element which has been engaged in the operational range before selection of the neutral range when the turbine speed exceeds a predetermined rotation speed.

A working fluid pressure control system may further comprise:

means for detecting initiation of engagement of the start-up friction element corresponding to the traveling range, and wherein the imitation detecting means includes means for detecting a turbine speed, and makes judgement that engagement is initiated when an increasing rate of the turbine speed is varied into negative.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiments of the present invention will be discussed with reference to the accompanying drawings. Each embodiment is for merely discussion for the invention and should not be taken to limit the invention. In fact, various correction and modification in the present invention should be obvious to those skilled in the art without departing from the scope or spirit of the invention. For instance, the features illustrated and described as a part of one embodiment should be applicable for other embodiment in order to create further embodiment. It should be noted that the same functional portions should be represented by the same reference numerals throughout the description given herebelow.

Figure 1:
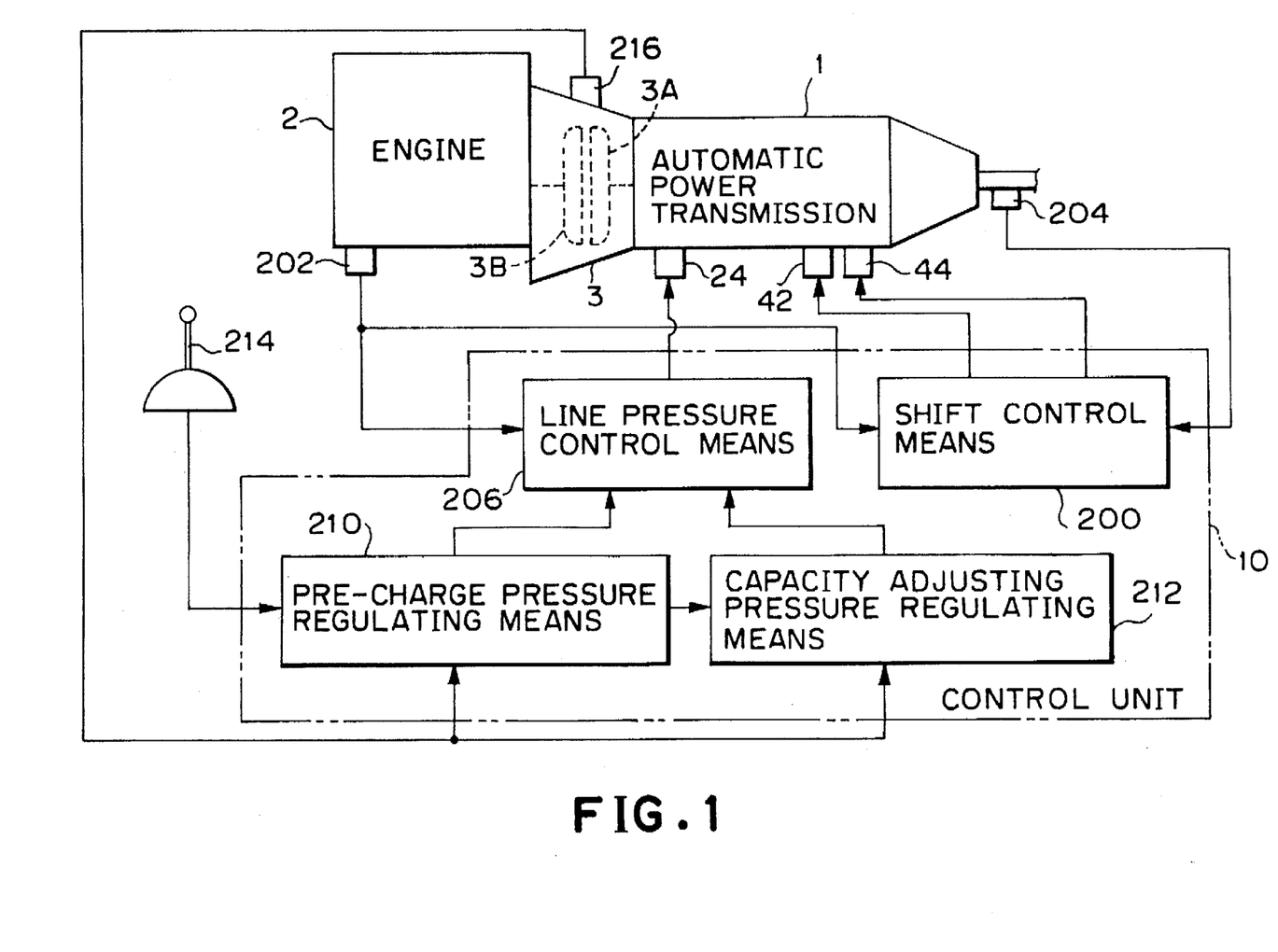
FIG. 1 is a block diagram showing the first embodiment of a working fluid pressure control system for an automatic power transmission according to the present invention.

FIG. 1 is a block diagram showing one embodiment of a working fluid pressure control system for an automatic power transmission according to the present invention. The reference numeral 1 denotes an automatic power transmission, and 2 denotes an engine. In the automatic power transmission 1, a gear train constituted of a plurality of sets of planetary gear sets is included. To the gear train, an output rotation of the engine 2 is input via a torque converter 3. Namely, to an input shaft of the automatic power transmission, a turbine 3A of the torque converter 3 is connected. On an output shaft of the engine 2, a pump impeller 3B of the torque converter 3 is connected.

It should be noted that the gear train of the automatic power transmission 1 is the same as that disclosed in Japanese Patent Application Laid-open No. 28571/1991. The disclosure of the above-identified publication is herein incorporated by reference. By combinations of ON and OFF of a first shift solenoid 42 and a second shift solenoid 44, various combinations of engaged friction elements and released friction elements are established for obtaining various power transmission speed ratios. Here, a forward clutch at a drive range and a reverse clutch at a reverse range correspond to a start-up friction element referred to in the present invention.

The reference numeral 10 denotes a control unit constituted of a microcomputer or so forth. A switching signal for the first shift solenoid 42 and the second shift solenoid 44 is output from shift control means 200 constructed in the control unit 10. At this time, judgement for shifting of the power transmission speed ratios is made on the basis of a predetermined shift schedule with taking a throttle angle signal obtained from a throttle sensor 202 detecting an open degree of a throttle valve of the engine 2 and a vehicle speed signal obtained from a vehicle speed sensor 204.

Reference numeral 24 denotes a line pressure solenoid. The line pressure solenoid 24 is constructed with an ON drain type solenoid valve. By control of the line pressure solenoid 24 by duty ratio, a line pressure can be controlled. Thus, the line pressure solenoid 24 is driven by a control signal output, normally responding to an open degree of a throttle valve, from line pressure control means 206 constructed in the control unit 10.

Here, in the shown embodiment, pre-charge pressure regulating means 210 and capacity adjusting pressure regulating means 212 are constructed within the control unit 10. With these means 210 and 212, line pressure control is performed from a neutral (N) range to a traveling (D, R) range, for example from a neutral (N) range to a drive (D) range.

Namely, the pre-charge pressure regulating means 210 detects a signal indicative of selection of the drive range, for example, from the neutral range from a range switching signal generated in response to selecting operation by means of a selector lever 214, detects a rotation speed of the turbine 3A as an input rotation speed of the automatic power transmission 1 from a turbine speed sensor 216, and outputs a control signal to the line pressure control means 206 depending thereon for temporarily elevating the line pressure abruptly and then dropping abruptly.

In the first embodiment of the present invention, a range condition before selection from N range to the traveling range is judged to control operation of the pre-charge pressure regulating means 210 depending thereon.

Namely, the pre-charge pressure regulating means 210 in the shown embodiment detects a condition where the drive range is selected from the reverse (R) range across the neutral range swiftly, for example, from the range switching signal generated upon selecting operation through the selector lever 214, and controls the line pressure to temporarily elevate abruptly and then drop abruptly.

The line pressure PL thus regulated via the pre-charge pressure regulating means 210 is abruptly elevated to a given pre-charging constant pressure Pc as soon as judgement the completion of releasing of the reverse clutch as the start-up friction element in the R range after switching from N range to D range, maintained at the pre-charging constant pressure Pc for a given period Tc, and subsequently dropped abruptly to a given pressure Pv, as shown in solid in FIG. 2.

It should be noted that the pre-charging constant pressure Pc is pre-charged to the forward clutch as set forth above, as the start-up friction element which is to be engaged upon switching from N range to D range.

On the other hand, the capacity adjusting pressure regulating means 212 receives a signal indicative of completion of pre-charging from the pre-charge pressure regulating means 210, outputs a control signal to the line pressure control means 206 and thus controls the line pressure to elevate at substantially constant rate.

Figure 3:
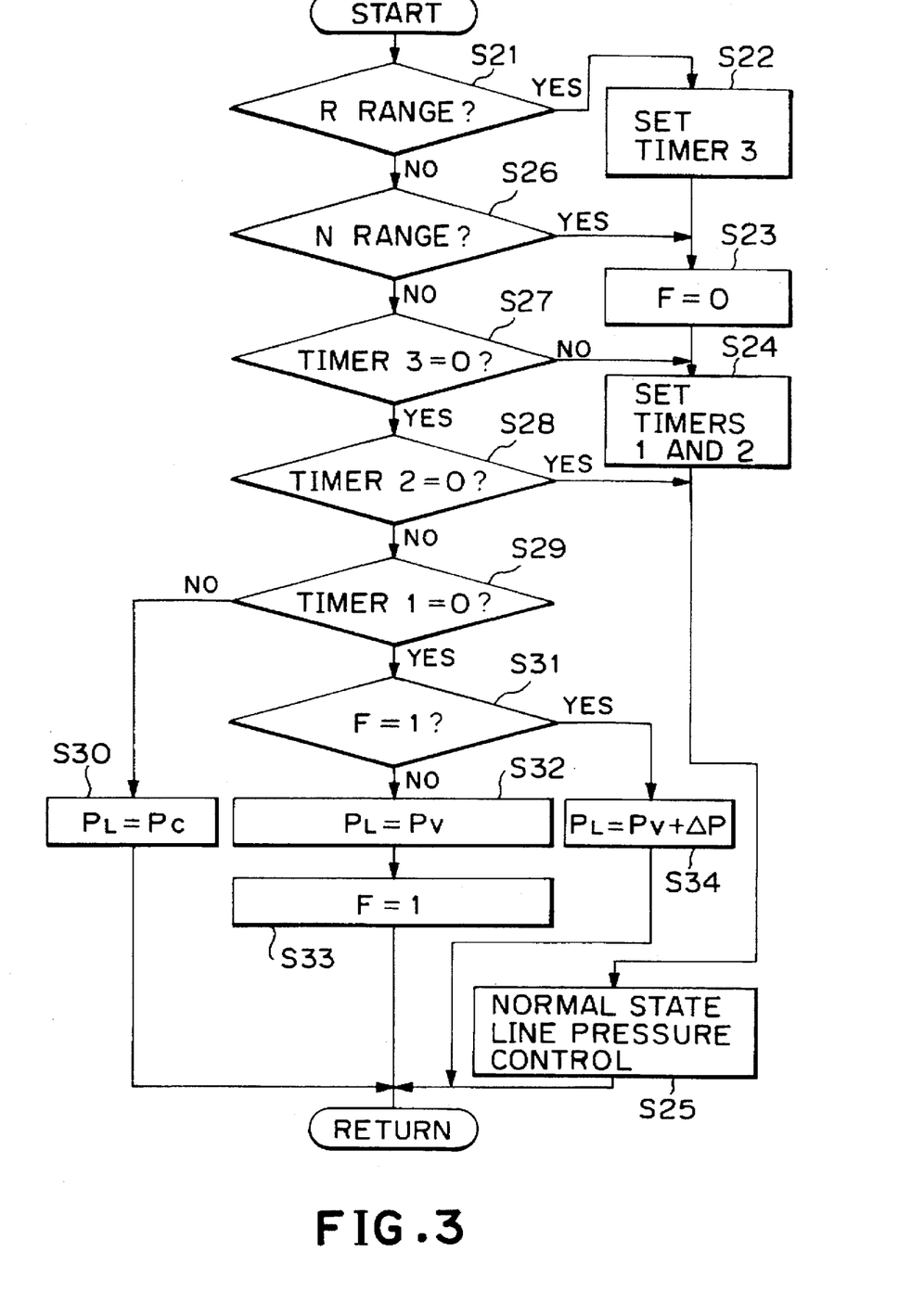
FIG. 3 is a flowchart showing one example of control procedure in the first embodiment of the working fluid pressure control system according to the invention.

One example of control procedure executed by the pre-charge pressure regulating means 210 and the capacity adjusting pressure regulating means 212 will be discussed with reference to a flowchart shown in FIG. 3. The shown control procedure is executed at every given period.

At first, at step S21, a current operational range is checked whether the current range is R range or not. If "YES", process is advanced to step S22 to set a timer 3 which will be discussed later, at a time Tt. Then, the process is further advanced to step S23 to set a flag F to 0 and then to step S24 to set a predetermined time Tc for a timer 1 provided in the pre-charge pressure regulating means 210 and a time Ts for a timer 2 provided in the capacity adjusting pressure regulating means 212. Furthermore, the process is advanced to step S25 to perform normal line pressure control.

It should be noted that the timers 1, 2 and 3 are subtracted (−1) per every given period and are stopped when timer values become 0.

On the other hand, when judgement whether the current operational range is N range or not at step S26, and answer is "YES", process is advanced to step S23, the flag F is set to 0. Then, process is advanced to step S24, the given time Tc is set to the timer 1 and the given time Ts is set to the timer 2. Furthermore, the process is advanced to step S25 to set for performing normal line pressure control.

When judgement at step S26 is "NO", judgement is made that selection from N range to D range has been made, then, the process is advanced to step S27 for checking whether a timer value of the timer 3 which has been set at step S22 becomes 0 or not. Namely, at step S27, check is made whether the given period Tt has elapsed since selection from R range. If the period Tt has not elapsed, the process is advanced to step S24 for setting again the given time Tc to the timer 1 and the given time Ts to the timer 2.

When the given time Tt has elapsed, namely judgement that releasing of the start-up friction element in the R range has been completed, is made, the process is advanced to step S28 to check whether a timer value of the timer 2 becomes 0 or not. Namely, check is made whether the engaging period Ts has elapsed or not. If "YES", it represents that engagement of the start-up friction element has been completed. Then, the process is advanced to step S25 to set for normal line pressure control.

When the answer is "NO" at step S28, the process is moved to a line pressure transition control. In such a case, at first, the timer 1 is checked whether the timer value thereof becomes 0 or not, namely whether the given period Tc for pre-charging has expired or not. If "NO", the process is advanced to step S30 for setting to make the line pressure PL at constant pressure Pc for pre-charging.

On the other hand, when result of judgement is "YES" at step S29, namely, when the given period Tc for pre-charging has elapsed, the process is advanced to step S31 to make judgement whether flag F is set to 1 or not. If "NO", the process is advanced to step S32 to set the line pressure PL at a given pressure Pv.

After step S32, the process is advanced to step S33 to set the flag F to 1. Then, the shown routine goes END.

On the other hand, when judgement at step S31 is "YES", namely, when the given pressure Pv is already set, the process is advanced to step S34, the line pressure PL is set at (Pv+ΔP) for elevating at a constant rate from the given pressure Pv.

Figure 2:
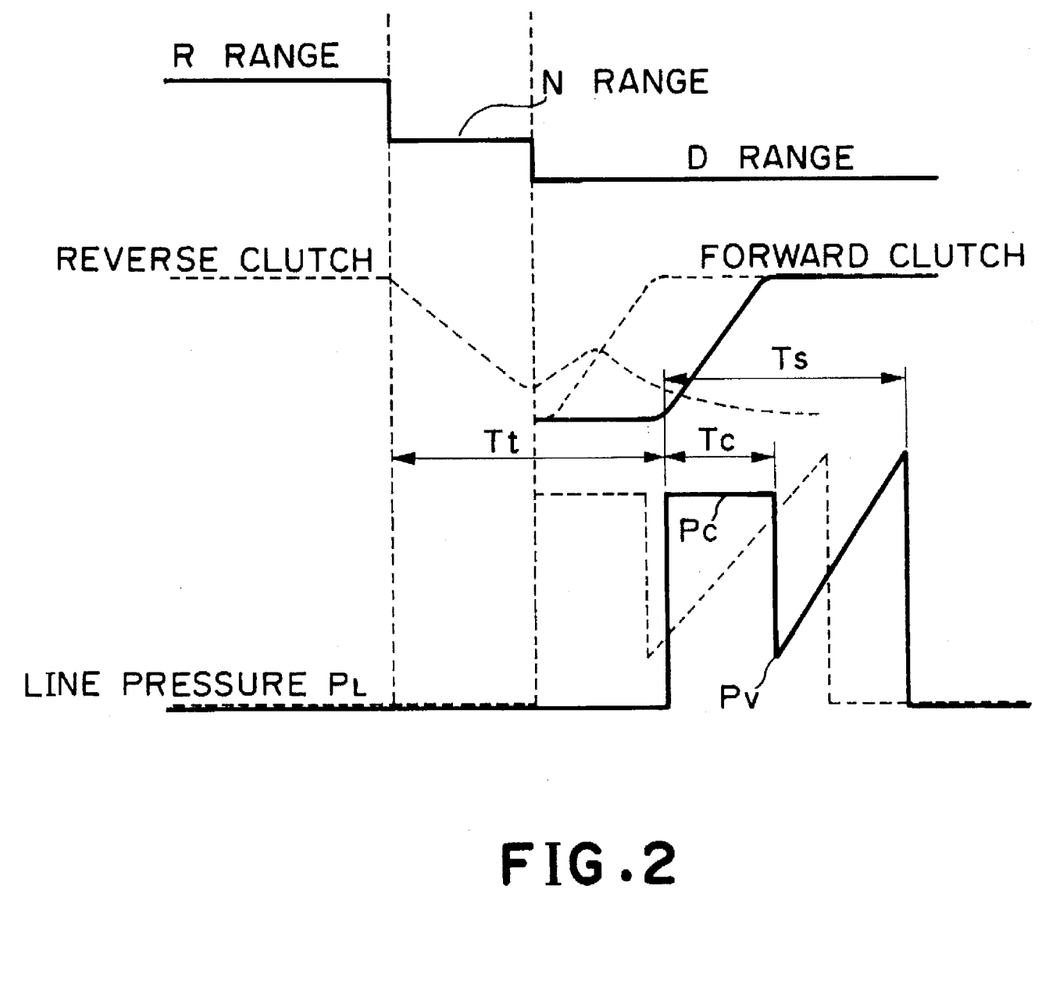
FIG. 2 is a timing chart for explaining operation in the first embodiment of the working fluid pressure control system according to the invention.
Figure 4:
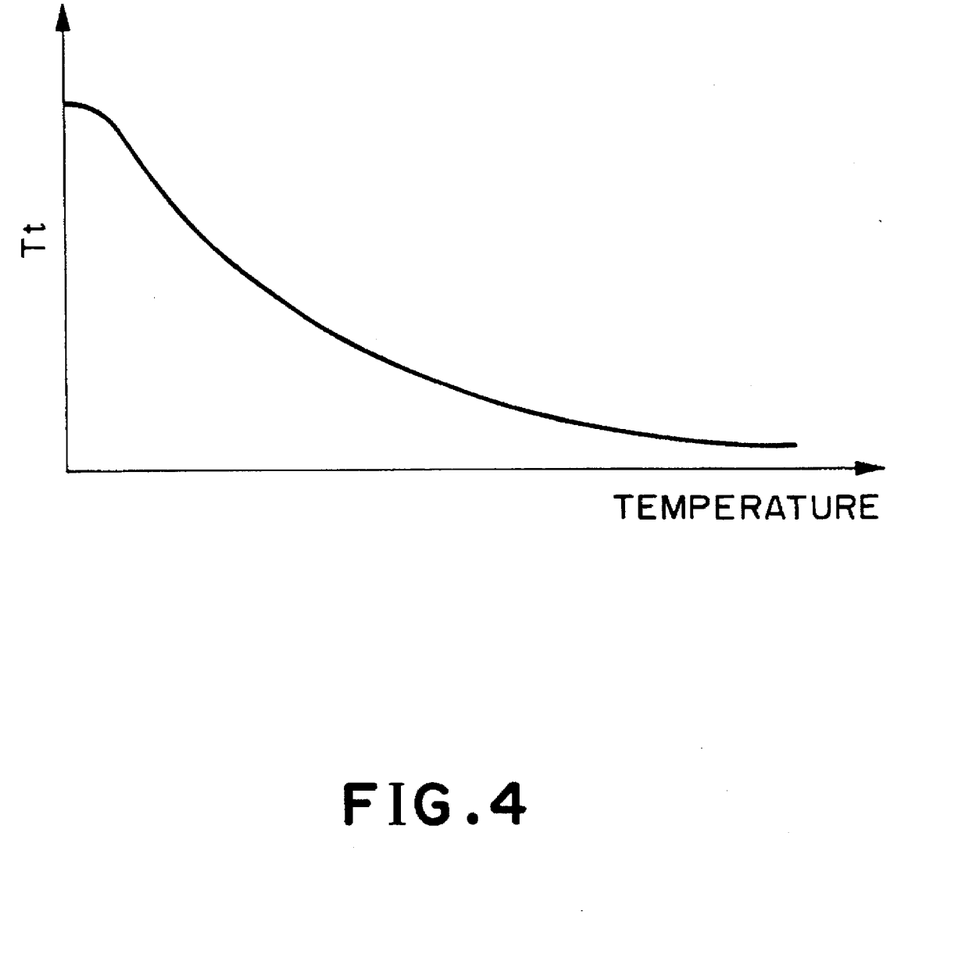
FIG. 4 is a map for setting a predetermined period Tt in the first embodiment of the working fluid pressure control system according to the invention.

The time Tt set to the timer 3 is set as an elapsed period from a timing where the operational range becomes other than R range, as shown in FIG. 2. The given time Tt is set to be varied depending upon a temperature Temp of a working fluid, as shown in FIG. 4. For example, the time Tt is preliminarily set to be shorter at higher temperature Temp of the working fluid and stored in a table. This is because viscosity of the working fluid becomes lower at higher fluid temperature, and correspondingly, a period to complete releasing the friction element can be shortened.

It should be noted that, in the shown embodiment, judgement that releasing of start-up friction element of R range has been completed is made by checking whether the given time Tt set by the timer 3 has elapsed or not. It is also possible to make judgement that releasing of the start-up friction element has been completed by detecting the turbine rotation speed exceeding a given rotation speed by a turbine speed sensor, in place.

In FIG. 2, one shown by a broken line is a result of control by the conventional system. By this, the reverse clutch which is held engaged in the R range, is affected by pre-charging at mid-way of releasing to cause delay, in releasing, resulting in interlocking with the forward clutch which is about engagement in D range to cause a substantial shock. Conversely to this, according to the shown embodiment of the present invention, after judgement that releasing of one start-up friction element is completed, pre-charging of the other start-up friction element is performed. Thus, problem set forth above will not arise.

Furthermore, the second embodiment of the working fluid pressure control system for the automatic power transmission according to the present invention will be discussed.

While the basic construction of this embodiment is substantially the same as that in the former embodiment, the second embodiment is differentiated in that the capacity adjusting pressure regulating means is not provided and a range state before selection from N range to a traveling range is determined to control operation of the pre-charge pressure regulating means 210. Namely, a pre-charge pressure regulating means 210 of the shown embodiment detects the condition swiftly selected to the drive range from the R range across the neutral range, from the range switching signal generated upon selection by operating the selector lever 214 to output the control signal to the line pressure control means depending thereon for temporarily elevating the line pressure abruptly and then dropping abruptly.

Figure 5:
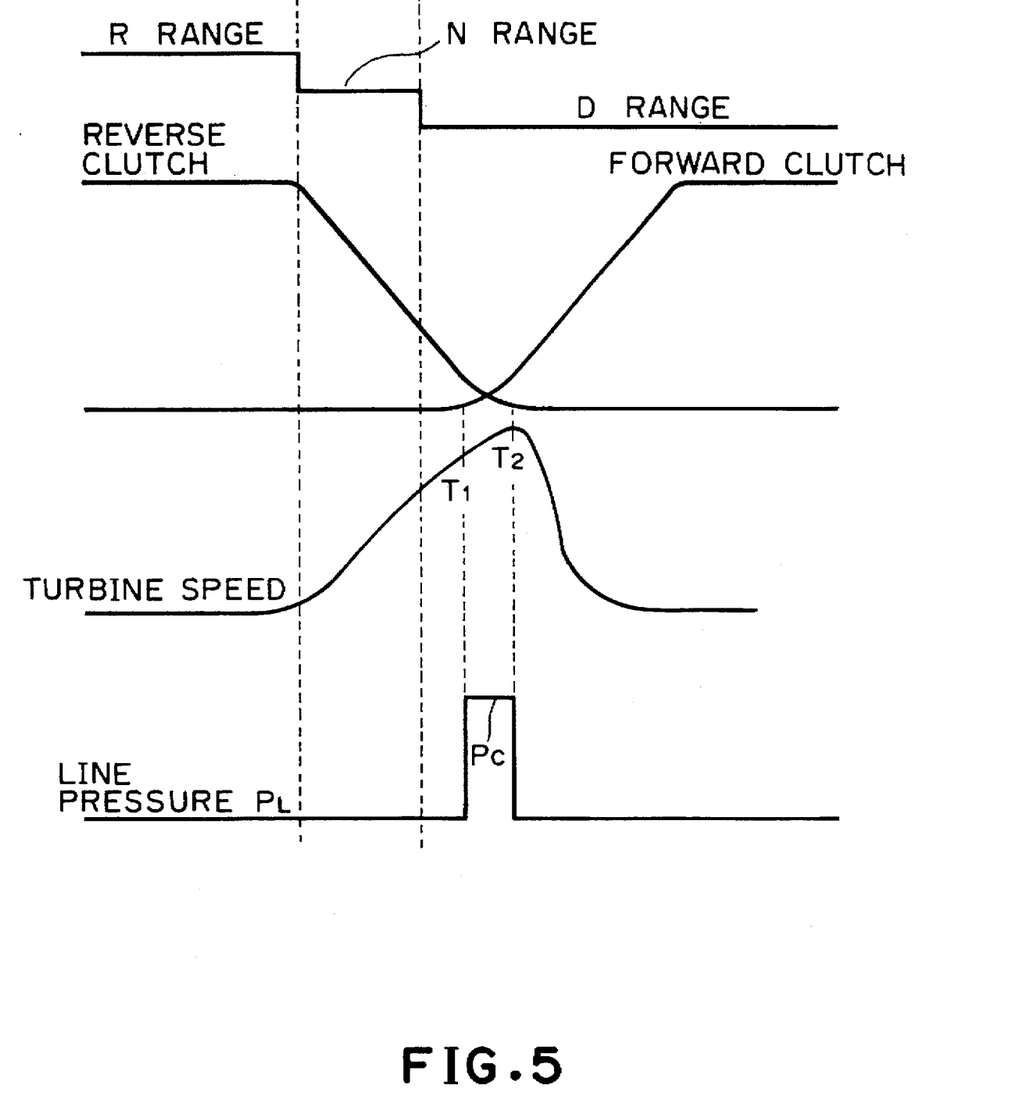
FIG. 5 is a timing chart for explaining operation in the second embodiment of the working fluid pressure control system for the automatic power transmission according to the invention.

The line pressure regulated via the pre-charge pressure regulating means 210 is elevated up to the given pre-charging constant pressure Pc simultaneously with judgement of completion of the releasing of the reverse clutch as the start-up friction element at the R range after switching from the N range to the D range, as shown in FIG. 5. The pre-charging constant pressure Pc is maintained for a given period until initiation of engaging of the start-up friction element at D range, and then dropped abruptly to the normal line pressure. It should be noted that the pre-charging constant pressure Pc is pre-charged to the forward clutch as start-up friction element to be engaged upon switching from N range to the D range.

Figure 6:
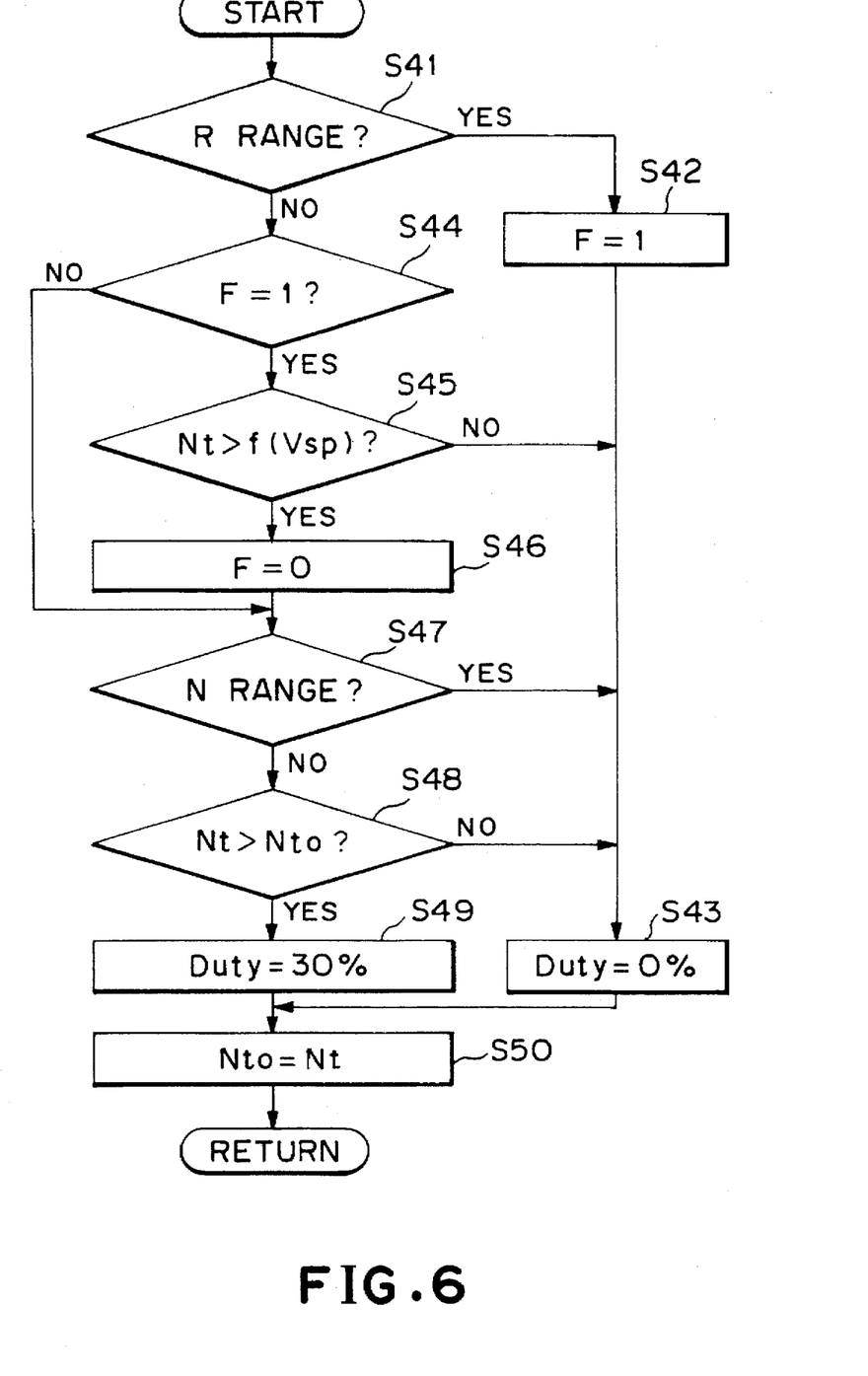
FIG. 6 is a flowchart showing one example of control procedure in the second embodiment of the working fluid pressure control system according to the invention.

One example of the control procedure to be executed by the pre-charge pressure regulating means 210 will be discussed hereinafter with reference to a flowchart in FIG. 6. It should be noted that the shown control procedure is executed at every predetermined period.

At first, at step S41, judgement whether the current operational range position is R range or not. If "YES", the process is advanced to step S42 to set the flag F to 1. Then, at step S43, the line pressure solenoid 24 is controlled by the duty ratio of 0% to set for normal state line pressure control. Thereafter, at step S50, as a turbine speed Nt, current rotation speed Nt0 is stored.

On the other hand, the result of judgement at step S41 is "NO", the process is advanced to step S44 to check whether the flag is set to 1 or not. When the flag F is 0, the process is directly advanced to step S47 and when the flag F is 1, namely when judgement is made that selection of operational range is made from R range by setting of flag F to 1 at step S42, the process is advanced to step S45 to check whether the turbine speed Nt is higher than or equal to a predetermined rotation speed f(Vsp) which will be discussed later. If "YES", the process is advanced to step S46 to set the flag to 0. Then, the process is advanced to step S47. Here, at step S45, the fact that the turbine speed Nt higher than or equal to the predetermined rotation speed f(Vsp) represents substantially complete release of the start-up friction element engaged in the R range. Then, through judgement at steps S47 and S48 discussed later, pre-charge is performed so that the line pressure PL becomes the pre-charging constant pressure Pc.

On the other hand, when the result of judgement at step S45 is "NO", the process is advanced to step S43 to control the line pressure solenoid 24 with 0% of duty ratio to set for performing normal state line pressure control.

Then, at step S47, check is performed whether the current operational range is N range or not. When the current operational range is N range, the process is advanced to step S43 for performing the normal state line pressure control.

On the other hand, when the result of judgement at step S47 is "NO", the process is advanced to step S48 with judgement that the operational range has been selected to D range from N range, to check whether the turbine speed Nt is higher than the turbine speed Nt0 stored in previous cycle, namely whether an increasing rate of the turbine speed becomes negative or not.

When the result of judgement at step S48 is "YES", namely when the increasing rate of the turbine speed is positive, the process is advanced to step S49 to control the line pressure solenoid at 30% of duty ratio for pre-charging the line pressure PL to the pre-charging constant pressure Pc.

On the other hand, when the result of judgement at step S48 is "NO", namely the increasing rate of the turbine speed is negative which represents initiation of engagement of the start-up friction element of D range, the process is advanced to step S43 to control the line pressure solenoid with 0% of duty ratio to return to normal state line pressure control.

It should be noted that after steps S49 and S43, the current rotation speed Nt0 is stored as the turbine speed Nt as set forth above, at step S50.

Thus, upon selection from N range to D range and if the operational range before selection to N range is R range, in response to the judgement that releasing of the reverse clutch as the start-up friction element in the R range is completed, based on the turbine speed, the line pressure is abruptly elevated to the given pre-charging constant pressure Pc. The pre-charging constant pressure Pc is maintained for a given period of time which is required for verification of initiation of engagement of the start-up friction element in the D range. Thereafter, the line pressure is abruptly dropped to the normal line pressure level.

Figure 7:
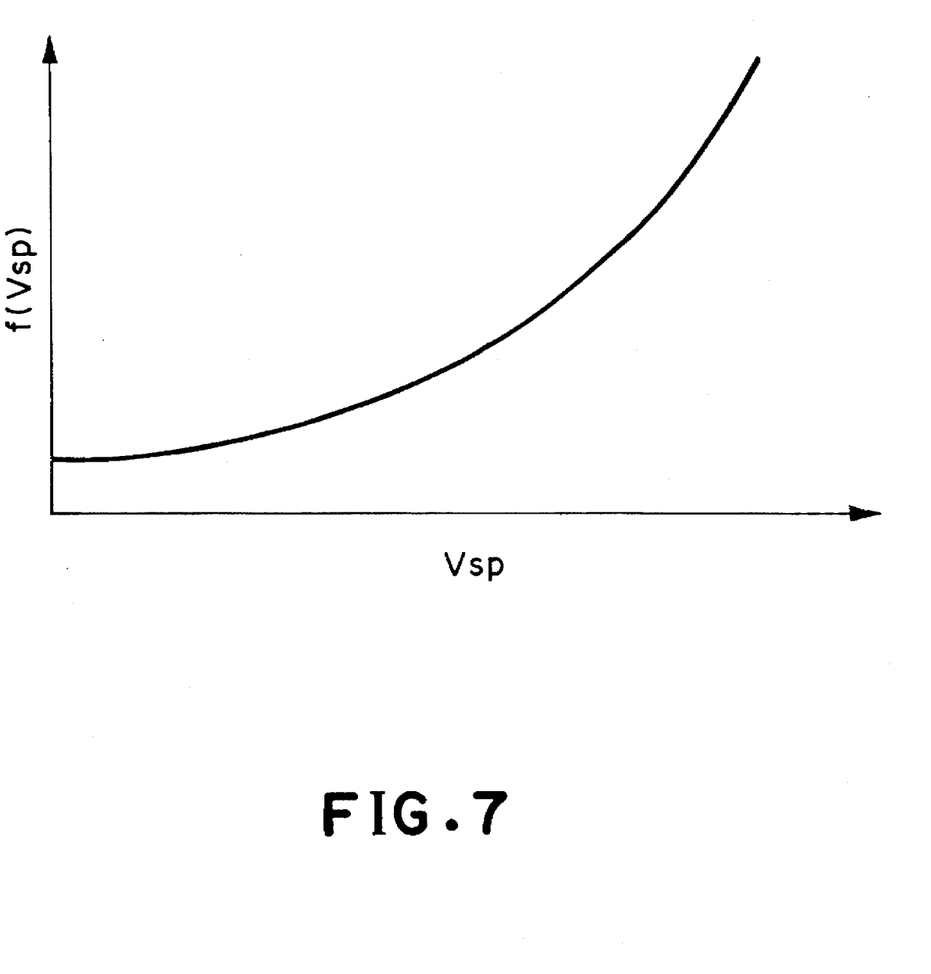
FIG. 7 is a map for setting a predetermined revolution speed f(Vsp) of the second embodiment of the working fluid pressure control system according to the invention.

Here, the predetermined rotation speed f(Vsp) set forth above, is set on the basis of the Vehicle speed Vsp which is obtained by the vehicle speed sensor 204, as shown in FIG. 7. The predetermined rotation speed f(Vsp) is preliminarily set to become slightly higher in response to increasing of the vehicle speed Vsp as shown in FIG. 7 and stored in a form of table. This is because that the turbine speed is increased according to increasing of the vehicle speed.

As shown in FIG. 5, in the shown embodiment, at a timing T1 where judgement is made that releasing of the start-up friction element in the R range has been completed, pre-charging of the start-up friction element in the D range is performed. Pre-charging is terminated at a timing T2 where initiation of engagement is confirmed. Therefore, interlocking of the reverse clutch which has been engaged in the R range and the forward clutch which is about to be engaged in the D range can be successfully avoided.

It should be noted that, in the foregoing embodiments, discussion has been given for selection from N range to D range as example of selection from N range to the traveling range. However, it should be obvious to those skilled in the art that the present invention is applicable even for selection from N range to R range. Also, the first and second embodiments of the present invention may be applicable for the case where the operational range is selected from D range to the R range across the N range.

As set forth above, according to the present invention, selection of the operational range of the automatic power transmission from the neutral range to the traveling range can be performed within a short period without causing a shock.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A working fluid pressure control system for an automatic power transmission, comprising:

pre-charge pressure regulating means for temporarily elevating a working fluid pressure abruptly and subsequently dropping abruptly and whereby generating a pre-charging constant pressure for a start-up friction element;

capacity adjustment pressure regulating means for gradually elevating said working fluid pressure from a dropped point of said pre-charge pressure for generating a capacity adjusting pressure for said start-up friction element, means for detecting an operational range before selection of neutral range, means, being active when the operational range before selection of the neutral range is different from a traveling range selected from the neutral range, for making judgement whether the start-up friction element which has been engaged in the operational range before selection of the neutral range, is released or not; and wherein said pre-charge pressure regulating means is operated in response to judgement that the start-up friction element which has been engaged in the operational range before selection of the neutral range, is released.

2. A working fluid pressure control system as claimed in claim 1, wherein said making judgement means makes judgement that the start-up friction element which has been engaged in the operational range before selection of the neutral range, is released, after expiration of a predetermine period from selection from said operational range before selection of neutral range to said traveling range.

3. A working fluid pressure control system as claimed in claim 2, wherein said predetermine period is set depending upon a temperature of the working fluid.

4. A working fluid pressure control system as claimed in claim 1, wherein said making judgement means includes means for detecting a turbine speed, and judges releasing of the start-up friction element which has been engaged in the operational range before selection of the neutral range when said turbine speed exceeds a predetermined rotation speed.

5. A working fluid pressure control system as claimed in claim 1, wherein said operational range before selection of the neutral range is reverse range and said traveling range is forward drive range.

6. A working fluid pressure control system for an automatic power transmission comprising:

pre-charge pressure regulating means, responsive to selection from neutral range to a traveling range, for temporarily elevating a working fluid pressure abruptly until detection of initiation of engagement of a start-up friction element corresponding to the selected traveling range and supplying a predetermined hydraulic pressure after initiation of engagement, means for detecting an operational range before selection of neutral range, means, being active when the operational range before selection of the neutral range is different from said traveling range selected from the neutral range, for making judgement whether the start-up friction element which has been engaged in the operational range before selection of the neutral range, is released or not; and wherein said pre-charge pressure regulating means is operated in response to judgement that the start-up friction element which has been engaged in the operational range before selection of the neutral range, is released.

7. A working fluid pressure control system as claimed in claim 6, wherein said operational range before selection of the neutral range is reverse range and said traveling range is forward drive range.

8. A working fluid pressure control system as claimed in claim 7, wherein said making judgement means includes means for detecting a turbine speed, and judges releasing of the start-up friction element which has been engaged in the operational range before selection of the neutral range when said turbine speed exceeds a predetermined rotation speed.

9. A working fluid pressure control system as claimed in claim 8, further comprising:

means for detecting initiation of engagement of said start-up friction element corresponding to said traveling range, and wherein said imitation detecting means includes means for detecting a turbine speed, and makes judgement that engagement is initiated when an increasing rate of the turbine speed is varied into negative.

* * * * *